United States Patent [19]

Lownsdale

[11] Patent Number: 4,628,639
[45] Date of Patent: Dec. 16, 1986

[54] WINDOW FRAME WEATHERSEAL FOR A MOTOR VEHICLE

[75] Inventor: Gary R. Lownsdale, Livonia, Mich.

[73] Assignee: Schlegel Corporation, Rochester, N.Y.

[21] Appl. No.: 763,819

[22] Filed: Aug. 8, 1985

[51] Int. Cl.$^4$ .............................................. E06B 7/16
[52] U.S. Cl. .................................... 49/498; 49/303
[58] Field of Search ................. 49/498, 489, 490, 491, 49/303, 310, 311

[56] References Cited

U.S. PATENT DOCUMENTS

| | | | |
|---|---|---|---|
| 4,047,751 | 9/1977 | Koike | 49/498 X |
| 4,455,785 | 6/1984 | Wahr et al. | 49/498 X |

Primary Examiner—Kenneth Downey
Attorney, Agent, or Firm—Cumpston & Shaw

[57] ABSTRACT

An elongate weatherseal for use in a motor vehicle body structure having an upper window frame, and a door having a windowpane movable between raised and lowered positions relative to the window frame. The weatherseal comprises an elongate hollow resiliently deformable body member having a V-shaped window retaining member with first and second arms. The first arm is secured to a first portion of the body member, and the second arm extends into the hollow part of the body member. When the windowpane is moved to its raised position, the upper end thereof engages a second portion of the body member and moves it inwardly into engagement with the closely spaced second arm. Inward movement of the second arm by the windowpane causes the first arm to move inwardly. Inward movement of the first arm flexes the first portion of the body member into engagement with the outer surface of the upper end of the windowpane for retaining the windowpane into sealing engagement with the weatherseal.

9 Claims, 4 Drawing Figures

WINDOW FRAME WEATHERSEAL FOR A MOTOR VEHICLE

BACKGROUND OF THE INVENTION

1. Field of the Invention

This invention relates generally to weatherseals, and more specifically to a weatherseal for the window frame of a motor vehicle having a door provided with a windowpane movable between raised and lowered positions relative to the window frame.

2. Description of the Prior Art

A roof rail weatherstrip for a motor vehicle is disclosed in U.S. Pat. No. 4,047,751, Koike which issued on Sept. 13, 1977. The disclosed weatherstrip comprises an elongated hollow resiliently deformable member secured to the roof rail. The resiliently deformable member has a web portion and a bridge portion. The bridge portion is so constructed and arranged in a hollow of the resiliently deformable member that when the windowpane is moved to its raised position, the bridge portion is compressed between the roof rail and the windowpane, biasing the web portion against the windowpane. When the door is closed with the windowpane in its raised position, the bridge portion is flexed to keep the web portion in contact with the windowpane.

U.S. Pat. No. 4,455,785, Wahr et al., which issued on June 26, 1984, discloses a weatherseal for windows adapted to be lowered and raised, such as side windows of a motor vehicle having doors with integral window frames. The weatherseal includes a sealing lip which is displaced in a direction toward the upper outer edge area of the windowpane when the windowpane is raised. At least one bell crank is arranged inside the seal having one leg extending into the sealing lip. When the windowpane is raised, the other leg of the bell crank acts as a pivot for pressing the sealing lip against the upper outer edge area of the windowpane.

It is a disadvantage of the prior art structures that Koike does not provide the positive mechanical action necessary to insure that blowout of a window glass panel does not occur. In Koike, in order to provide a seal that will permit a window to be closed both when the door is open and when the door is closed, the outermost portion of the seal must lie above the plane along which the top of the window travels as it is closed in the fully raised position. The deflection of a necessarily flexible seal from this position to a position below this plane for preventing blowout is only marginally effective.

The structure of Wahr et al. is an attempt to improve on the effectiveness of the Koike structure, but introduces a further problem. Wahr et al.'s structure cannot be used in an automobile that does not have a movable frame surrounding the window glass and carried by the door. Particularly, Wahr et al. is not usable in hardtop convertibles where it is necessary that the door be closeable with the window glass in the raised position. Further, the device of Wahr et al. is complex and expensive and is not suitable for applications where cost is important.

Accordingly, it is an object of this invention to provide a weatherseal for engaging and restraining the top edge of a windowpane from blowout.

It is another object of this invention to provide a blowout preventing weatherseal that can be used in hardtop convertible vehicles in which the window frame is not carried by the door.

SUMMARY OF THE INVENTION

In accordance with a preferred embodiment of this invention, an elongate weatherseal is disclosed having a preferably hollow resiliently deformable body member. The body member has means for mounting it to a support, such as an upper window frame of a motor vehicle. The body member has a first leg portion, and a second leg portion connected to an outer end portion of the first leg portion and extending transversely therefrom. A V-shaped member has a first arm secured to the first leg portion, and a second arm extending into the hollow of the body member at the junction of the first and second arms. A portion of the second arm is closely spaced from the second leg portion.

In a more specific aspect of the invention, the weatherseal is disclosed for use in a motor vehicle body structure having an upper window frame, and a door having a windowpane movable between raised and lowered positions relative to the window frame. The weatherseal has means for rigidly mounting the body member to the upper window frame. The first leg portion is engageable with the window frame, and the second leg portion is engageable by the upper end of the windowpane. Accordingly, when the windowpane is moved to its raised position while the door is closed, or the door is closed with the windowpane in its raised position, the upper end of the windowpane engages and biases the second arm inwardly. This causes the first arm to pivot the window frame engaging leg portion into contact with the outer edge surface of the upper end of the windowpane for retaining the windowpane into sealing engagement with the weatherseal.

In another aspect of the invention, the body member is formed from a polyurethane or other soft resilient polymeric material, the mounting means on the body member comprises an elongate projection slidable into a corresponding channel in the upper window frame, the frame engaging leg portion is flat, the first arm of the windowpane retaining member is embedded in the frame engaging leg portion in substantially parallel relation thereto, and the V-shaped windowpane retaining member is formed from a metal material.

Primary advantages of the weatherseal of this invention are its simplicity of design and construction, and the lack of any requirement for high precision in manufacture or the holding of parts to close tolerances. Another advantage is the ability to obtain a weatherseal that faithfully, reliably and repetitively engages and retains a raised windowpane both when the door is closed with a raised windowpane, or when the windowpane is raised after the door is closed.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
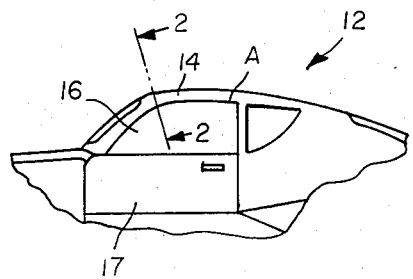
FIG. 1 is a partial side elevational view of a vehicle in which a preferred embodiment of the weatherseal of this invention is incorporated.

Referring now in detail to the drawings, and more particularly to FIG. 1, a preferred embodiment of a weatherseal 10 of this invention is shown incorporated in a motor vehicle 12. The motor vehicle is of the "hardtop convertible" type in which a roof frame defines an upper window frame 14 or upper side of a window opening; that is, there is no frame support for the top or side edges of a windowpane 16 which is movable by conventional means between raised and lowered positions in a door 17.

In motor vehicles having "frameless" windowpanes, disturbing "wind noises" are generated at higher driving speeds due to a break in the seal between the upper edge of the windowpane and the weatherseal. The seal break is supposedly due to a relatively higher pressure in the vehicle passenger compartment compared to the relatively lower pressure proximate the outer skin of the moving vehicle. This pressure difference results in outward movement of the upper edge of the unsupported windowpane.

Although the weatherseal 10 of this invention is preferable for use in motor vehicles 12 having "frameless" windowpanes, it also may be used advantageously in conventional motor vehicles in which the windowpanes are mounted in doors which provide fixed peripheral window frames for the outer edges of the windowpanes in their raised position.

The weatherseal 10 will now be described with reference to FIGS. 2 and 3. The weatherseal comprises an elongate hollow resiliently deformable body member 18 preferably formed from any suitable soft resilient material, such as a polymeric material including, for example, rubber, TPR, EDPM and polyurethane foam. The body member 18 is mounted to window frame 14 by means of a projection 20 which is slidably received in a corresponding channel 22 in window frame 14. Body member 18 preferably has a flat window frame engaging leg portion 24 which in the mounted position of the weatherseal engages the outer surface of a flat wall 26 of window frame 14. The body member 18 further has a windowpane engaging leg portion 28 connected to the outer end portion 30 of window frame engaging leg portion 24. Leg portion 28 extends transversely inwardly from end portion 30, and has a reverse S-shaped cross section to enhance the camming interaction between leg portion 28 and the upper end portion of windowpane 16 when the windowpane is raised with door 17 closed, or the door closed with a raised windowpane 16.

V-shaped retaining member 32 for releasably retaining the upper edge of raised windowpane 16 in sealing engagement with weatherseal 10 will now be described. Retaining the upper edge of the windowpane prevents outward movement of the windowpane and the generation of "wind noises" at higher driving speeds of the motor vehicle. This is achieved by strategically locating short lengths of the retaining members 32 in weatherseal 10, preferably at the points where deflection of the windowpane due to the pressure differential is greatest, namely at the point where the weatherseal is curved on window frame 14, as seen at section line 2—2 of FIG. 1, and at the upper rear corner of the window frame at point A.

Figure 4:
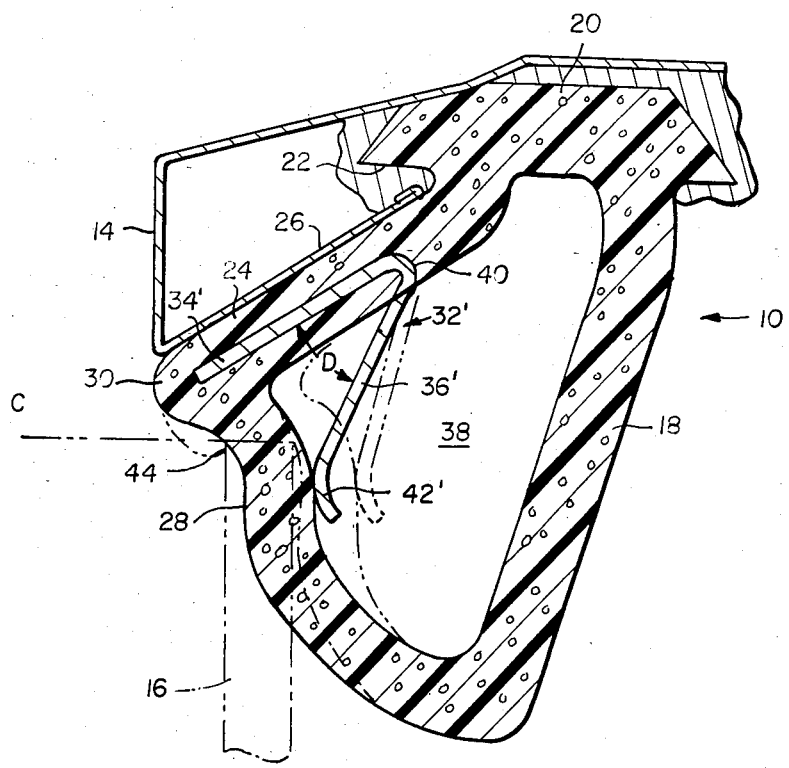
FIG. 4 is a view similar to FIG. 2 of another embodiment of the weatherseal of this invention, in which the weatherseal is shown in full lines when the windowpane is in its lowered position, and in dotted lines when the windowpane is in its raised position.

The V-shaped retaining member 32 is preferably formed from any suitable metal or other relatively rigid material such as stiff plastic material, and comprises a first flat arm 34 secured to frame engaging leg portion 24 by any suitable means, such as by embedding arm 34 in leg portion 24 in a molding operation. The V-shaped retaining member 32 further comprises a second flat arm 36 forming an included angle B with arm 34, and extending from leg portion 24 into the hollow area 38 of body member 18. The junction point 40 of arms 34, 36 is embedded in leg portion 24 and forms a pivot for window retaining member 32. Arm 36 has a free bent ramp portion 42 arranged adjacent to windowpane engaging leg portion 28. Ramp portion 42 is arranged with respect to leg portions 34 and 36 so as to engage the upper edge of windowpane 16 when the windowpane is moved from its lower to its raised position when the door is closed. It will be readily appreciated that in the absence of ramp 42, angle B, in order to insure that leg 34 captured windowpane 16 when the door is shut with the window in the raised position, would be so narrow that the clip would interfere with the raising of the window from the lowered to the raised position if attempted with the door closed. This is due to the requirement that the end of leg 34 must move from a position out of engagement with the top of window 16 to a position that engages and restrains the top of window 16 as the window is moved from the open to the closed position, either horizontally as the door closes, or vertically as the window is closed. This simply cannot be accomplished with a strictly V-shaped retaining member, but rather requires an either inwardly or outwardly extending ramp portion in accordance with the invention. The clip must provide a camming surface as exemplified either by the outer surface of leg 42 or the inner surface of leg 42' as shown in FIG. 4 for engaging the upper edge of window 16 when the same is moved from lowered to raised while the door is closed. As will be appreciated, the actual angle B between legs 34 and 36 is rendered noncritical thereby and the clip will be effective to restrain the window in hardtop convertibles applications.

Figure 2:
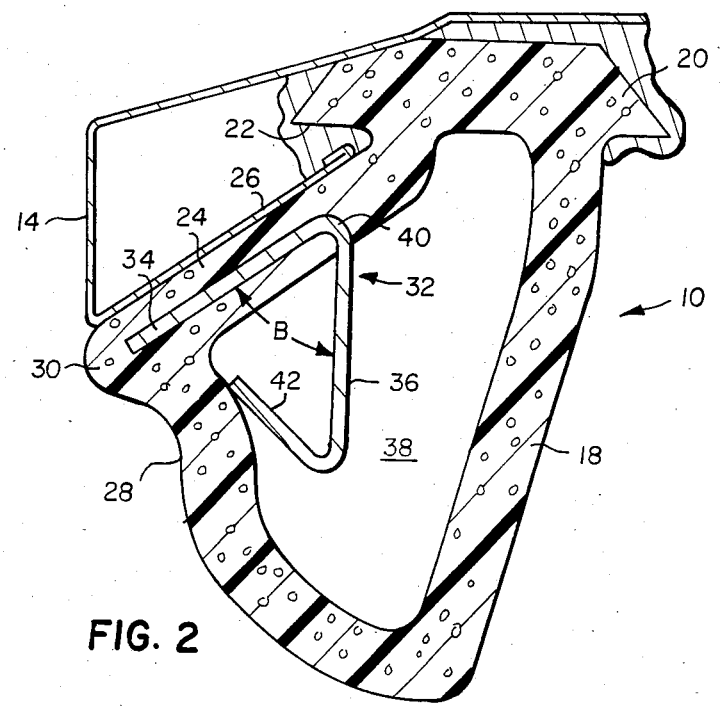
FIG. 2 is an enlarged partial sectional view taken substantially along line 2—2 of FIG. 1 with the windowpane in its lowered position.
Figure 3:
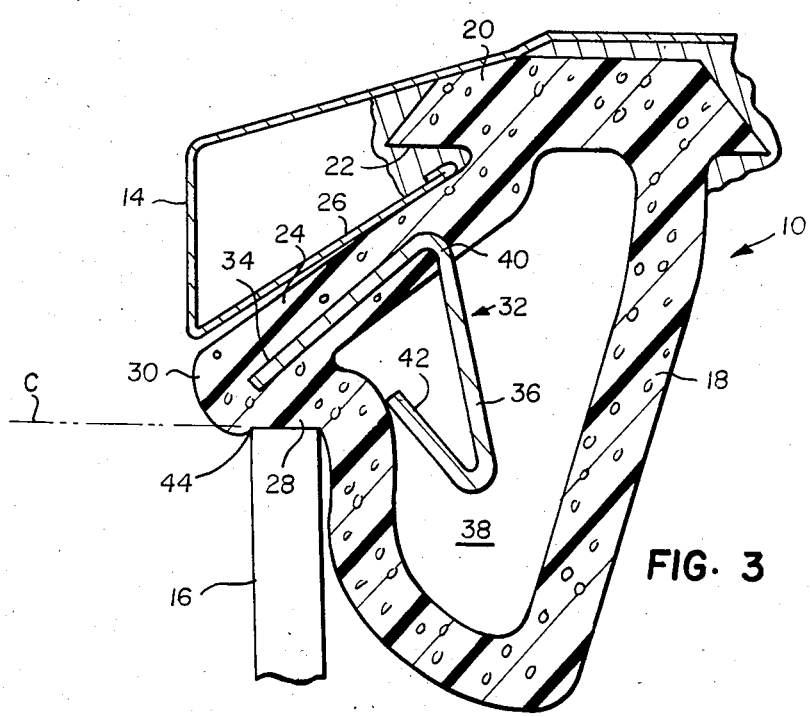
FIG. 3 is a view similar to FIG. 2 with the windowpane in its raised position.

In the operation of this invention, movement of windowpane 16 to its raised position while the door 17 is closed causes the upper end of windowpane 16 to engage leg portion 28, shown in its normal position in FIG. 2, and to flex it and weatherseal 10 into the windowpane retaining position shown in FIG. 3. Movement of leg portion 28 imparts pivotal movement to arm 36 causing arm 34 to pivot at junction 40 for moving leg portion 24 into positive engagement with the outer edge 44 of the upper end of windowpane 16. This positive engagment is sufficient to prevent outward movement of the windowpane and "wind noise" at high driving speeds. However, this positive engagement does not prevent manual pivotal movement of door 17 and raised windowpane 16 to their open position along line C, as seen in FIG. 3. Also, door 17 and raised windowpane 16 can be easily closed. During such door closing, the upper end of windowpane 16 travels along line C striking window engaging leg portion 28 in its FIG. 2 position, and flexing it into the windowpane retaining position seen in FIG. 3.

With reference to FIG. 4, another embodiment of weatherseal 10 is shown in which parts identical to parts shown in FIGS. 2 and 3 are denoted by the same numerals, and similar parts are denoted by the same numerals primed. In this embodiment, V-shaped retaining member 32' has an included angle D between arms 34', 36' that is smaller than included angle B (FIG. 2). Also, free bent ramp portion 42' is inclined downwardly instead of upwardly.

While preferred embodiments of the invention have been shown and described with particularly, it will be appreciated that various changes and modification may suggest themselves to one having ordinary skill in the art upon being apprised of the present invention. It is intended to encompass all such changes and modifications as fall within the scope and spirit of the appended claims.

What is claimed is:

1. An elongate weatherseal comprising:
   a generally triangular elongate resilently deformable hollow body member having first, second and third sides;
   means on said body member for mounting said body member to a support; and
   a V-shaped window retaining member having a first arm secured to said first side, and a second arm extending into the hollow of said body member and having an end portion of said second arm closely spaced from said second side.

2. A weatherseal according to claim 1 wherein said first side is flat, and said first arm of said window retaining member is embedded in said first side in substantially parallel relation thereto.

3. A weatherseal according to claim 1 wherein said first side is flat, and said first arm is embedded in said first side in substantially parallel relation thereto with a free end portion of said first arm located at the end of said first side.

4. A weatherseal according to claim 3 wherein said second arm has a ramp portion at the end thereof.

5. An elongate weatherseal for use in a motor vehicle body structure defining an upper window frame, and having a door windowpane movable between raised and lowered positions relative to the window frame comprising:
   an elongate hollow resiliently deformable body member;
   means on said body member for mounting said body member to the upper window frame;
   a window frame engaging leg portion of said body member adapted to engage a portion of the window frame, said window frame engaging leg portion having an outer end portion;
   a windowpane engaging leg portion of said body member connected to said outer end portion of said window frame engaging leg portion and extending transversely inwardly therefrom; and
   a V-shaped windowpane retaining member having a first arm secured to said frame engaging leg portion, and a second arm extending into the hollow of said body member from said window frame engaging leg portion substantially at the pivot junction of said first and second arms, and having a portion of said second arm closely spaced from said windowpane engaging leg portion, whereby with the windowpane in its raised position, the upper end thereof engages and pivots said second arm portion inwardly causing said first arm to flex said window frame engaging leg portion into contact with the outer surface of the upper end of the windowpane for retaining the windowpane into sealing engagement with the weatherseal.

6. A weatherseal according to claim 5 wherein said body member is formed of a polyurethane foam material, and said windowpane retaining member is formed from a metal material.

7. A weatherseal according to claim 6 wherein said mounting means on said body member comprises an elongate projection slidable into a corresponding channel in the upper window frame.

8. A weatherseal according to claim 7 wherein said frame engaging leg portion is flat, and said first arm of said window retaining member is embedded in said frame engaging leg portion in substantially parallel relation thereto with a free end portion of said first arm located at said outer end portion of said frame engaging leg portion.

9. A weatherseal according to claim 8 wherein said second arm has a ramp portion at the end thereof closely spaced to and engageable by said windowpane engaging leg portion.

* * * * *